US012715005B2

(12) United States Patent
Pelong et al.

(10) Patent No.: US 12,715,005 B2
(45) Date of Patent: Aug. 25, 2026

(54) SYSTEM AND METHOD FOR MONITORING OPERATION OF METAL SCRAP SHREDDER

(71) Applicant: Ford Motor Company, Dearborn, MI (US)

(72) Inventors: James Pelong, Macomb, MI (US); William Morrison, Gibraltar, MI (US); Chandra Sekhar Jalluri, Canton, MI (US); Brodie Schultz, Ferndale, MI (US); Himanshu Rajoria, Canton, MI (US); Bryan Barresi, Amherstburg (CA); Elizabeth Bullard, Royal Oak, MI (US)

(73) Assignee: Ford Motor Company, Dearborn, MI (US)

( * ) Notice: Subject to any disclaimer, the term of this patent is extended or adjusted under 35 U.S.C. 154(b) by 435 days.

(21) Appl. No.: 18/346,903

(22) Filed: Jul. 5, 2023

(65) Prior Publication Data

US 2025/0010310 A1 Jan. 9, 2025

(51) Int. Cl.
*B02C 25/00* (2006.01)
*B02C 23/00* (2006.01)

(52) U.S. Cl.
CPC .............. *B02C 25/00* (2013.01); *B02C 23/00* (2013.01)

(58) Field of Classification Search
CPC ............................ B02C 23/00; B02C 2201/06
See application file for complete search history.

(56) References Cited

U.S. PATENT DOCUMENTS

| | | | | |
|---|---|---|---|---|
| 11,019,412 | B2 | 5/2021 | Samkowiak et al. | |
| 2002/0185358 | A1* | 12/2002 | Zeitler | B65G 47/52 700/223 |
| 2003/0168316 | A1* | 9/2003 | Knepple | B65G 47/30 198/460.1 |
| 2006/0016233 | A1 | 1/2006 | Schoch | |
| 2008/0079918 | A1* | 4/2008 | Huang | H01J 37/3299 355/53 |
| 2011/0303775 | A1* | 12/2011 | Kim | B02C 23/02 241/34 |
| 2012/0111979 | A1* | 5/2012 | Jensen | B02C 18/142 241/36 |
| 2021/0134462 | A1* | 5/2021 | Fukuda | G16H 50/50 |
| 2023/0413831 | A1* | 12/2023 | Ge | A21B 1/48 |
| 2024/0092008 | A1* | 3/2024 | Hüllenkremer | B29C 48/07 |
| 2024/0408714 | A1* | 12/2024 | Dietz | B23Q 17/22 |

FOREIGN PATENT DOCUMENTS

| | | |
|---|---|---|
| WO | 2003052533 | 6/2003 |

* cited by examiner

*Primary Examiner* — Santosh R Poudel
(74) *Attorney, Agent, or Firm* — Burris Law, PLLC

(57) ABSTRACT

A method of monitoring operation of a shredder or health of a shredder component includes: setting a profile of a selected parameter of the shredder, wherein the profile includes a nominal value, a tolerance of the nominal value, and a predetermined range of the selected parameter outside the tolerance; obtaining an actual value of the selected parameter; comparing the actual value with the profile of the selected parameter; determining the operational condition of the shredder based on a comparison between the actual value and the profile of the selected parameter. The profile is obtained based on experimental data, statistics, or machine learning.

15 Claims, 2 Drawing Sheets

SYSTEM AND METHOD FOR MONITORING OPERATION OF METAL SCRAP SHREDDER

FIELD

Figure 1:
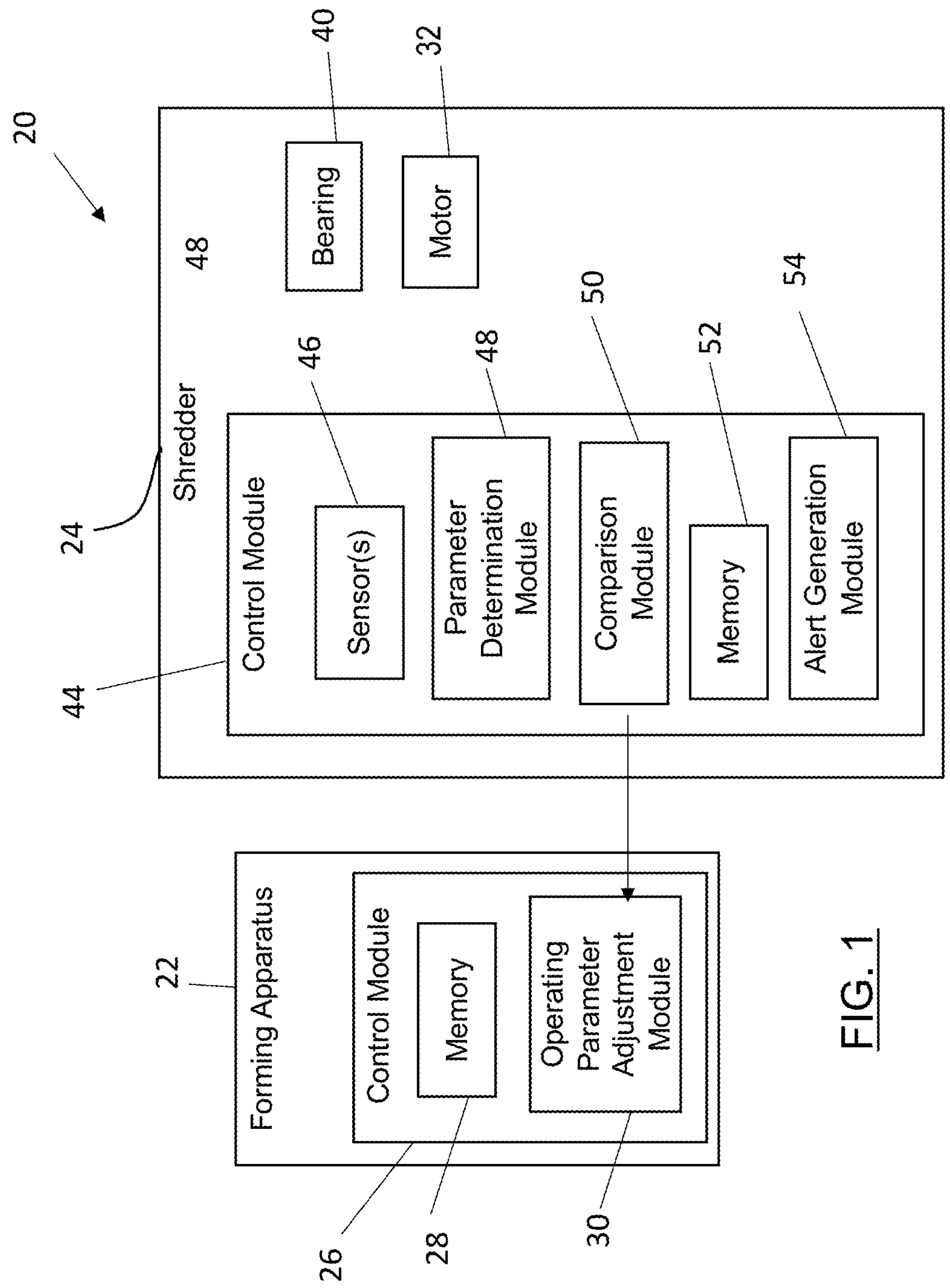

The present disclosure relates to a system and a method for monitoring a metal scrap shredder associated with a sheet stamping operation.

BACKGROUND

The statements in this section merely provide background information related to the present disclosure and may not constitute prior art.

A sheet stamping apparatus is typically used to create an engineered shaped panel by performing forming operations, such as trimming and punching, on a flat sheet metal. A scrap shredder is generally disposed downstream from the sheet stamping apparatus for receiving and cutting the scrap removed from the forming operations into smaller pieces before the scrap is delivered to a scrap collection container/site. When the scrap is not properly cut into smaller pieces, the scrap may block the chutes between the sheet stamping apparatus and the scrap shredder, causing the sheet stamping apparatus unable to perform the desired forming operations. Typically, the sheet stamping apparatus must be stopped before the scrap is cleared, resulting in downtime of the sheet stamping apparatus.

The issues relating to blockage of scrap in the scrap shredder are addressed in the present disclosure.

SUMMARY

This section provides a general summary of the disclosure and is not a comprehensive disclosure of its full scope or all of its features.

In one form, a method of monitoring an operation of a shredder or health of a shredder component is provided, which includes: setting a profile of a selected parameter of the shredder, wherein the profile includes a nominal value, a tolerance of the nominal value, and a predetermined range of the selected parameter outside the tolerance; obtaining an actual value of the selected parameter; comparing the actual value with the profile of the selected parameter; determining an operational condition of the shredder based on a comparison between the actual value and the profile of the selected parameter.

In other features, the method further includes determining the shredder is operated in one of a normal condition, a subnormal condition and an abnormal condition based on the comparison; determining the shredder is operated in a subnormal condition when the actual value is within the predetermined range. The selected parameter is selected from a group consisting of vibration, temperature, and electrical current, torque, and electrical power of a motor of the shredder. The actual value of the selected parameter is obtained by a sensor. The sensor is a vibration sensor or a temperature sensor. The predetermined range of a selected parameter may be obtained based on experimental data, statistics, or machine learning. The actual value of the selected parameter is obtained by calculations based on another one or more parameters. The shredder is disposed downstream from a forming apparatus and is configured to cut scrap removed from the forming apparatus. The forming apparatus is selected from a group consisting of a stamping press, a punching apparatus, a cutting apparatus. The profile is specific to a process performed by the forming apparatus. The profile is specific to a product formed by the forming apparatus.

In still other features, the method further includes: adjusting operating parameters of the forming apparatus when the actual value is within the predetermined range; and determining, by a controller, that the shredder is operated in an abnormal condition when the actual value is outside the predetermined range. The predetermined range has a limit that coincides with a limit of the tolerance.

In another form, a system is provided, which includes a shredder disposed downstream from a forming apparatus and configured to cut scrap generated in the forming apparatus into smaller pieces. The shredder includes at least one of a sensor and a parameter determination module to obtain an actual value of a parameter selected to be monitored. The shredder further includes a memory configured to store profiles of a selected parameter corresponding to a plurality of components to be formed in the forming apparatus, and a comparison module configured to compare the actual value with the profile to determine an operational condition of the shredder.

In other features, the profiles each include a nominal value of the selected parameter, a tolerance of the nominal value, and a predetermined range of the selected parameter deviating from the tolerance of the nominal value. The comparison module is configured to determine that the shredder is operated in a subnormal condition when the actual value is within the predetermined range. The comparison module is configured to determine that the shredder is operated in an abnormal condition when the actual value deviates from the tolerance of the nominal value and is outside the predetermined range. The comparison module is in communication with a controller of the forming apparatus such that the controller of the forming apparatus is configured to adjust operating parameters of the forming apparatus according to the operational condition of the shredder.

Further areas of applicability will become apparent from the description provided herein. It should be understood that the description and specific examples are intended for purposes of illustration only and are not intended to limit the scope of the present disclosure.

DRAWINGS

Figure 2:
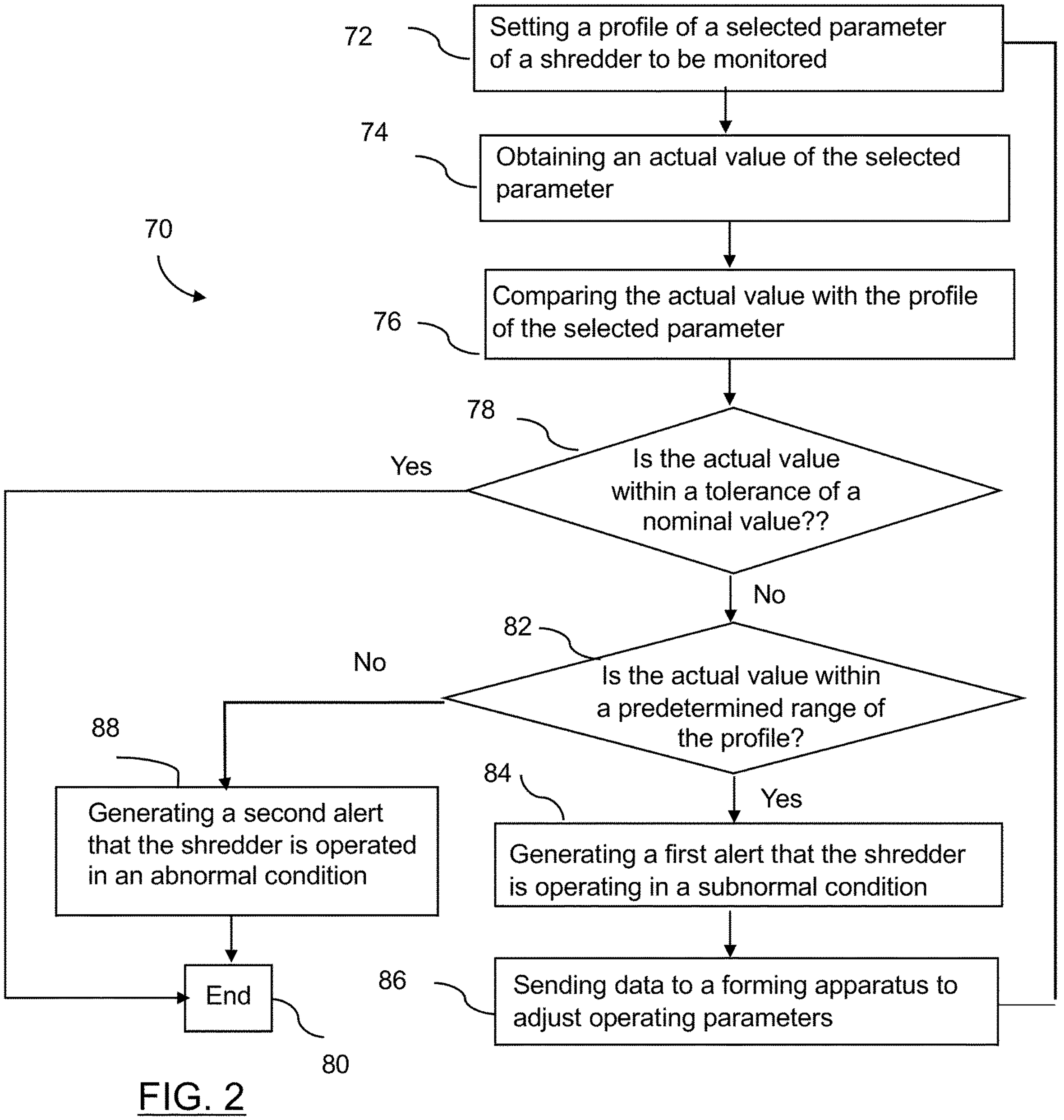

In order that the disclosure may be well understood, there will now be described various forms thereof, given by way of example, reference being made to the accompanying drawings, in which:

FIG. 1 is a schematic diagram of a system for forming a sheet metal into a component having a predetermined shape in accordance with the teachings of the present disclosure; and FIG. 2 is a flow diagram of a method of monitoring an operation of a shredder in accordance with the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring to FIG. 1, a system 20 for forming a sheet metal into a component or a product having a predetermined shape in accordance with the teachings of the present disclosure includes a forming apparatus 22 and a shredder 24 connected to the forming apparatus 22 via, for example, one or more chutes (not shown). The forming apparatus 22 may be a stamping press, a punching apparatus or a cutting apparatus and is configured to perform one or more forming operations, such as stamping, trimming, and punching, on a sheet metal to form a component having a predetermined shape and size, such as an engineered shaped panel. During the forming process, scrap is generated in the forming apparatus 22 and is delivered to the shredder 24, which cuts the scrap into smaller pieces before the scrap is delivered to a scrap collection container or site (not shown).

The forming apparatus 22 includes a control module 26 (e.g., in the form of one or more controller) configured to control the operation of the forming apparatus 22. The control module 26 includes a memory 28 and an operating parameter adjustment module 30. The memory 28 is configured to store a plurality sets of operating parameters corresponding to a plurality of components to be formed and/or corresponding to a plurality of forming processes to be performed in the forming apparatus 22. Each set of operating parameters of the forming apparatus 22 is specific to a particular component to be formed by a particular forming process. The operating parameters for forming a particular component also vary depending on the material, size, thickness and grade of the sheet metals fed into the forming apparatus 22. The operating parameter adjustment module 30 is configured to adjust or update the operating parameters in response to data received from the shredder 24 relating to an operational condition of the shedder 24, which will be described in more detail below.

The shredder 24 includes blades (not shown) for cutting the scrap delivered from the forming apparatus 22, at least one bearing 40 for supporting the blades on a housing (not shown) of the shredder 24, at least one motor 42 for driving the blades, and a control module 44 (e.g., in the form of one or more controller) configured to control the operation of the shredder 24. The control module 44 includes at least one sensor 46, a parameter determination module 48, a comparison module 50, a memory 52, and an alert generation module 54.

The control module 44 of the shredder 24 is configured to select a parameter of the shredder 24 to be monitored. The sensor 46 is configured to obtain a measurement (i.e., an actual value) of the parameter selected to be monitored (hereinafter "selected parameter"), such as vibration, temperature, electrical current, torque or power of the shredder 24. The sensor 46 may be a vibration sensor for obtaining data relating to vibration of the shredder 24 or a shredder component or a temperature sensor for measuring temperature of the shredder 24 or a shredder component. The sensor 46 may be disposed at locations where the sensor 46 is exposed to strong vibration or high temperature, such as near the bearing 30 or the motor 32 of the shredder. However, the sensor 46 may be disposed on the housing or other locations without departing from the scope of the present disclosure.

Alternatively, instead of using a sensor 46 for direct measurement of the selected parameter, the parameter determination module 48 may be used to calculate an actual value of the selected parameter based on other parameters. For example, when the selected parameter is an electrical load, such as current, torque, or power, the actual value of the selected parameter can be calculated based on other available parameters, thereby eliminating the need to use an additional sensor for monitoring. Therefore, the actual value of the selected parameters may be obtained by measurement (by the sensor 46) or by calculation (by the parameter determination module 48).

The memory 52 is configured to store data relating to the profiles of one or more selected parameters for different Job ID and/or Part ID of the forming apparatus 22. The Part ID refers to information about a specific product/component to be formed, such as an engineered panel with a desired shape, size, thickness, material, grade of material etc., by the forming apparatus 22. The Job ID refers to information about a specific operation, including cutting, trimming, and punching, to be performed in the forming apparatus 22. The profiles are created to correspond to each Job ID and/or Part ID. Therefore, the profiles are specific to a particular job being performed in the forming apparatus 22 to ensure optimal operation of the shredder 24 downstream from the forming apparatus 22.

Each profile includes a nominal value, a tolerance of the nominal value, a predetermined range outside the tolerance of the nominal value. The predetermined range has a limit that coincides with a limit of the tolerance of the nominal value. The nominal value and the tolerance of the nominal value represent a value or a range of the selected parameter, indicating the shredder is operated in an optimal running condition without any issues. The predetermined range of the selected parameter represents a range of the selected parameter where the shredder 24 is not operated in an optimal running condition but in an acceptable (i.e., subnormal) condition with some issues. In the subnormal condition, the shredder 24 can still perform the desired cutting function, but may require more power or current draw of the motor of the shredder 24 due to some issues in the shredder 24, for example, minor blockage of scrap in the shredder 24. The profiles including the nominal value, the tolerance of the nominal value, and the predetermined range of a selected parameter may be obtained based on experimental data, statistics, or machine learning.

The comparison module 50 is configured to compare an actual value of the selected parameter with a corresponding profile to determine whether the actual value of the selected parameter is within the tolerance of the nominal value (representing normal operating condition of the shredder), within the predetermined range (representing subnormal operating condition of the shredder), or outside the tolerance of the nominal value and outside the predetermined range (representing abnormal operating condition of the shredder).

The alert generation module 54 is configured to generate and send an alert indicating an operational condition of the shredder 24. When the comparison module 50 determines that the actual value of the selected parameter deviates from the tolerance of the nominal value but is within the predetermined range, the comparison module 50 sends a signal to the alert generation module 54, which in turn generates a first alert indicating that the shredder is operated in a subnormal condition.

The subnormal condition may be caused by minor blockage in the shredder or improper setting of operating parameter of the forming apparatus 22. Upon receipt of the first alert, an operator may check the condition of the shredder 24 to resolve any possible issues that may gradually lead to malfunction of the shredder 24. For example, the scrap may reach the shredder 24 at a unique position and could not be properly cut into small pieces as desired. In response to the first alert, the operator may change the position of the scrap to resolve a potential blockage issue. In addition, the comparison module 50 is also configured to send a signal to the operating parameter adjustment module 30 of the forming apparatus 22 to adjust the operating parameters of the forming apparatus 22. By changing the operating parameters of the forming apparatus 22, the metal sheet may be cut or trimmed in the forming apparatus 22 in a way to generate scrap having a shape or position that can be relatively easily delivered to and cut in the shredder 24.

If the comparison module 50 determines that the actual value significantly deviates from the tolerance of the nominal value to the extent that it falls outside the predetermined range, the comparison module 50 sends a signal to the alert generation module 54, which then generates a second alert indicating that the shredder 24 is operated in an abnormal condition and maintenance may be needed.

Referring to FIG. 2, a method 70 of monitoring an operation of a shredder or health of a shredder component starts with setting a profile of a parameter of a shredder 24 to be monitored in step 72. The parameter of the shredder 24 to be monitored may be vibration, temperature or electrical load (e.g., current, torque, power) of a motor that drives the blades of the shredder 24. Next, an actual value of the selected parameter of the shredder 24 is obtained in step 74. The actual value may be a measured value obtained by a sensor or a calculated value obtained by the parameter determination module 48 of the shredder 24. The actual value of the selected parameter is then compared with the profile of the selected parameter in step 76. The comparison module 50 of the shredder 24 determines whether the actual value of the selected parameter is within the tolerance of the nominal value in step 78. If the actual value is within the tolerance of the nominal value, the comparison module 50 determines that the shredder 24 is operated in an optimal running or normal condition. The method ends in step 80.

If the actual value is outside the tolerance of the nominal value, the comparison module 50 determines whether the actual value is within a predetermine range in step 82. If the actual value is outside the tolerance of the nominal value, but is within the predetermined range, the comparison module 50 determines that the shredder 24 is operated in a subnormal condition. A first alert is generated indicating that the shredder is operated in a subnormal condition in step 84.

The comparison module 50 of the shredder is also configured to send signals to the control module 26 of the forming apparatus 22 such that the control module 26 of the forming apparatus 22 can adjust the operating parameters of the forming apparatus 22 in step 86. Then the method goes back to step 72 to reset the profile of the selected parameter of the shredder 24 in response to the adjusted operating parameters of the forming apparatus 22 and to continue to monitor the selected parameter of the shredder 24 to determine when the shredder 24 is operated in a normal, subnormal or abnormal condition.

When it is determined that the actual value is outside the predetermined range in step 82, the comparison module 50 determines that the shredder 24 is operated in an abnormal condition. The comparison module 50 generates a second alert indicating that the shredder 24 is operated in an abnormal condition and that maintenance may be needed in step 88. In response to the second alert, an operator should check the shredder 24 to resolve any potential issue that would otherwise cause malfunction of the shredder 24. The second alert may also be sent to the forming apparatus 22 to stop or slow down the operation of the forming apparatus 22 until the issue is resolved. The method ends in step 80.

The shredder and the method of monitoring an operation of the shredder according to the present disclosure can identify an operational condition of the shredder or health of a shredder component by monitoring a selected parameter before a malfunction of the shredder occurs. The control module of the shredder uses a sensor or a parameter determination module to obtain a measured or calculated value of the selected parameter to be monitored and compares the measured or calculated value with a Job or Part specific profile to determine whether the shredder is operated in an optimal running condition, a subnormal condition, or an abnormal condition before a malfunction of the shredder occurs. Moreover, the operating parameters of the forming apparatus 22 can be adjusted accordingly in response to the identified operational condition of the shredder, making the entire system including the forming apparatus and the shredder operate more efficiently. This monitoring also ensures proper operation of the shredder and reduces any downtime events due to scrap backups.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method of monitoring operation of a shredder, comprising:

setting a profile of a selected parameter of the shredder, wherein the profile includes a nominal value, a tolerance of the nominal value, and a predetermined range of the selected parameter outside the tolerance; obtaining an actual value of the selected parameter;

comparing, by a processor, the actual value with the profile of the selected parameter; determining, by the processor, an operational condition of the shredder based on a comparison between the actual value and the profile of the selected parameter;

based on the determination of the operational condition as a subnormal condition when the actual value is within the predetermined range, transmitting, by the processor, data to a controller of a forming apparatus;

adjusting, by the controller of the forming apparatus, operating parameters of the forming apparatus based on the data; and operating, by the controller of the forming apparatus, the forming apparatus based on the adjusted operating parameters;

wherein the shredder is disposed downstream from a forming apparatus and is configured to cut scrap removed from the forming apparatus.

2. The method according to claim 1, further comprising determining the shredder is operated in one of a normal condition, the subnormal condition and an abnormal condition based on the comparison.

3. The method according to claim 1, wherein the selected parameter is selected from a group consisting of vibration, temperature, and electrical current, torque, and electrical power of a motor of the shredder.

4. The method according to claim 3, wherein the actual value of the selected parameter is obtained by a sensor.

5. The method according to claim 4, wherein the sensor is a vibration sensor or a temperature sensor.

6. The method according to claim 3, wherein the actual value of the selected parameter is obtained by calculations based on another one or more parameters.

7. The method according to claim 1, wherein the profile is obtained based on experimental data, statistics, or machine learning.

8. The method according to claim 1, wherein the forming apparatus is selected from a group consisting of a stamping press, a punching apparatus, a cutting apparatus.

9. The method according to claim 1, wherein the profile is specific to a process performed by the forming apparatus.

10. The method according to claim 1, wherein the profile is specific to a product formed by the forming apparatus.

11. The method according to claim 1, further comprising determining, by the processor, that the shredder is operated in an abnormal condition when the actual value is outside the predetermined range.

12. The method according to claim 1, wherein the predetermined range has a limit that coincides with a limit of the tolerance.

13. A method of monitoring operation of a shredder, comprising:

setting a profile of a selected parameter of the shredder, wherein the profile includes a nominal value, a tolerance of the nominal value, and a predetermined range of the selected parameter outside the tolerance; obtaining an actual value of the selected parameter;

comparing, by a processor, the actual value with the profile of the selected parameter;

determining, by the processor, an operational condition of the shredder based on a comparison between the actual value and the profile of the selected parameter;

adjusting operating parameters of a forming apparatus when the actual value is within the predetermined range; and operating the forming apparatus based on the adjusted operating parameters;

wherein the shredder is disposed downstream from a forming apparatus and is configured to cut scrap removed from the forming apparatus.

14. A system comprising:

a shredder disposed downstream from a forming apparatus and configured to cut scrap generated in the forming apparatus into smaller pieces, the shredder including:

at least one of a sensor and a processor to obtain an actual value of a parameter selected to be monitored;

a memory configured to store profiles of a selected parameter corresponding to a plurality of components to be formed in the forming apparatus, the profiles include a nominal value of the selected parameter, a tolerance of the nominal value, and a predetermined range of the selected parameter deviating from the tolerance of the nominal value;

the processor configured to compare the actual value with the profile to determine an operational condition of the shredders based on the determination of the operational condition as a subnormal condition when the actual value is within the predetermined range, the processor is configured to transmit data to a controller of the forming apparatus, wherein the controller of the forming apparatus is configured to adjust operating parameters of the forming apparatus based on the data and to operate the forming apparatus based on the adjusted operating parameters.

15. The system according to claim 14, wherein the processor is configured to determine that the shredder is operated in an abnormal condition when the actual value deviates from the tolerance of the nominal value and is outside the predetermined range.

* * * * *